US006825616B2

(12) United States Patent
Kobayakawa et al.

(10) Patent No.: US 6,825,616 B2
(45) Date of Patent: Nov. 30, 2004

(54) DISCHARGE BULB WITH SHROUD GLASS HAVING METAL OXIDE IN SPECIFIC RANGE

(75) Inventors: Yukihiro Kobayakawa, Shizuoka (JP); Masaya Shido, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/160,029

(22) Filed: Jun. 4, 2002

(65) Prior Publication Data

US 2002/0180358 A1 Dec. 5, 2002

(30) Foreign Application Priority Data

Jun. 5, 2001 (JP) ..................................... P.2001-169099

(51) Int. Cl.[7] ............................ H01J 17/16; C03C 3/06

(52) U.S. Cl. ......................................... 313/636; 501/54

(58) Field of Search ............................ 313/17, 624, 25, 313/318.01, 312, 636, 324, 26, 634, 635; 439/611; 501/54, 53

(56) References Cited

U.S. PATENT DOCUMENTS 3,785,722 A * 1/1974 Schultz ........................ 501/54
4,234,542 A * 11/1980 Romine ........................ 422/98
4,361,779 A * 11/1982 van der Steen et al. .... 313/636
5,262,365 A * 11/1993 Oyobe et al. ................. 501/54
5,464,462 A * 11/1995 Langer et al. ................ 501/53
5,541,471 A * 7/1996 Terheijden et al. ......... 313/112
5,654,608 A * 8/1997 Westemeyer et al. ....... 313/634
6,057,635 A * 5/2000 Nishimura et al. ........... 313/25
6,239,539 B1 * 5/2001 Mochiduki et al. .... 313/318.01
6,274,973 B1 * 8/2001 Mochiduki et al. .... 313/318.09
6,294,861 B1 9/2001 Mochiduki et al.
6,429,577 B1 * 8/2002 Kiryu et al. .................. 313/25

* cited by examiner

*Primary Examiner*—Joseph Williams
*Assistant Examiner*—Peter Macchiarolo
(74) *Attorney, Agent, or Firm*—Sughrue Mion, PLLC

(57) ABSTRACT

A discharge bulb comprising an arc tube body having such a structure that a shroud glass having metal oxide ($Al_2O_3$, $CeO_2$) added thereto is attached integrally to surround an arc tube sealing Hg, NaI, ScI and Xe gases. A total amount of addition of the metal oxide in the shroud glass is set to be 4000 ppm or more which is effective for fulfilling an electrostatic shielding function for an external electric field and less than 7000 ppm which can hold the excellent molding property of the shroud glass.

7 Claims, 6 Drawing Sheets

FIG. 3

(UNIT : ppm)

| SAMPLE | $Al_2O_3$ | $TiO_2$ | $CeO_2$ | SUM OF ADDITIVE | RESULT OF Na PASSAGE |
|---|---|---|---|---|---|
| CONVENTIONAL | 264 | 17 | 1376 | 1657 | Na PASSAGE |
| COMPARATIVE 1 | 1218 | 423 | 1413 | 3055 | Na PASSAGE |
| SAMPLE 1 | 2437 | 17 | 2826 | 5279 | Na NO-PASSAGE |
| SAMPLE 2 | 4212 | 67 | 2433 | 6711 | Na NO-PASSAGE |
| COMPARATIVE 2 | 28 | 513 | 2027 | 2569 | Na PASSAGE |

FIG. 4

(UNIT : ppm)

| AMOUNT OF $CeO_2$ ADDED | 1000 | 1500 | 2500 | 3000 |
|---|---|---|---|---|
| Na-PASSAGE | NG | NG | OK | OK |
| UV-CUT PERFORMANCE | NG | OK | OK | OK |

FIG. 5

(UNIT : ppm)

| AMOUNT OF $Al_2O_3$ ADDED | 500 | 1000 | 1500 | 2000 |
|---|---|---|---|---|
| Na - PASSAGE | NG | NG | OK | OK |

FIG. 6

(UNIT : ppm)

| AMOUNT OF METAL ADDED | 5000 | 7000 | 9000 |
|---|---|---|---|
| MOLDING PROPERTY OF SHROUD GLASS | OK | △ | NG |

| | | | |
|---|---|---|---|
| BALLAST | CIRCUIT STRUCTURE | ○ | × |
| | NUMBER OF COMPONENTS | ○ | × |
| | REDUCTION OF SIZE | ○ | × |
| | COST | ○ | × |
| BULB | LUMINOUS FLUX RETENTION RATE | × | ○ |
| | CHROMATIC CHANGE | × | ○ |

DISCHARGE BULB WITH SHROUD GLASS HAVING METAL OXIDE IN SPECIFIC RANGE

BACKGROUND OF THE INVENTION

1. Field of the Invention

The present invention relates to a discharge bulb including a cylindrical shroud glass welded integrally with, and surrounding an arc tube. More particularly, the invention relates to an arc tube body including a cylindrical shroud glass having 4000 to 7000 ppm of metal oxide added thereto.

2. Description of the Related Art

As shown in FIG. 7, a discharge bulb has such a structure that an arc tube 2 for filling a light emission substance such as Hg, NaI or ScI together with an Xe gas in a hermetic glass bulb 2*a* having electrodes 3 and 3 provided opposite to each other comprises an arc tube body 1 surrounded by a cylindrical shroud glass 4. The reference numeral 5 denotes a molybdenum foil sealed and attached to a pinch seal portion 2*b* of the arc tube and the reference numeral 6 denotes a lead wire to be led from the pinch seal portion 2*b*.

A method of lighting the arc tube 2 of the discharge bulb includes a positive electrode lighting method for applying a positive voltage to the electrodes 3 and 3 of the arc tube to be discharged and a negative electrode lighting method for applying a negative voltage to the electrodes 3 and 3 of the arc tube to be discharged. As shown in FIGS. 8 and 9, the negative electrode lighting method is excellent in a chromaticity characteristic and has a long lifetime. As such, taking into account only the benefits of the lighting method from a bulb perspective, the negative electrode lighting method is better than the positive electrode lighting method. More specifically, FIG. 8 shows a chromaticity (x, y) characteristic in which the state of a change in the luminescent color of the arc tube is plotted every 500 hours. Referring to the chromaticity (x, y) characteristic, as shown in an arrow of FIG. 8, a change in the chromaticity (x, y) is higher (smaller), that is, the lifetime is shorter (longer) in the positive (negative) electrode lighting method with the passage of time. In respect of a ballast circuit which is indispensable to the light-up of the arc tube, however, the negative electrode lighting method has such a drawback that an inverting circuit for inverting a positive voltage once generated into a negative voltage is required, and therefore, the ballast circuit becomes complicated and large-sized which increases costs as shown in FIG. 9. The positive or negative electrode lighting method is employed depending on whether the lifetime of the bulb or an advantage on the ballast circuit side has a priority. The structure of the discharge bulb is entirely identical and any method can be employed.

In the development of the discharge bulb and ballast circuit of this kind, there is a problem in that the luminescent color of the arc tube becomes pale with time and a luminous flux is thereby reduced in the process of study in which the discharge bulb is to be further improved.

This cause was investigated. As a result, it was found that NaI and ScI in (a hermetic glass bulb of) the arc tube are ionized to be an $Na^+$ ion and an $Sc^+$ ion by the light-up of the arc tube (a discharge between the electrodes 3 and 3) as shown in FIG. 7 and the $Na^+$ ion is smaller than the $Sc^+$ ion and the molecule of a quartz glass (the molecule of the quartz glass constituting the arc tube and a shroud glass) and thereby passes through the side wall of the hermetic glass bulb 2*a* and that of the shroud glass 4 so that a red luminescent component (Na) in (the hermetic glass bulb of) the arc tube is decreased.

More specifically, the discharge bulb is inserted and attached to a reflector and is thus used. In some cases, a ground potential (0 volt) is present in the vicinity of the arc tube body 1, for example, a metallic shielding shade 8 for controlling light distribution is provided in the vicinity of the arc tube 2 or means for holding the inside of the reflector to the ground potential (0 volt) is provided in order to shield an electromagnetic wave generated during the light-up of the arc tube (the discharge between the electrodes) (an electromagnetic wave which is the cause of an electromagnetic noise in an electronic component, such as a car radio). In the positive electrode lighting method for applying a positive voltage to the electrode 3, particularly, the $Na^+$ ion in the hermetic glass bulb 2*a* is pulled toward the ground potential (0 volt) side upon receipt of the influence of an electric field generated between the electrode 3 and the ground potential (the shielding shade 8) and thereby passes through the hermetic glass bulb 2*a* (and the shroud glass 4) as shown in an arrow of FIG. 7. Thus, the $Na^+$ ion passes toward the outside of the arc tube.

To the shroud glass 4 is added metal oxide for absorbing (shielding) ultraviolet rays (hereinafter referred to as UV) within a wavelength range which is generally hazardous to a human body or metal oxide for preventing a devitrification phenomenon in which a halogen ion ionized in (the hermetic glass bulb of) the arc tube or a tungsten ion evaporated from an electrode reacts with a quartz glass ($SiO_2$) and sticks as a white crystal to the inside of the hermetic glass bulb. The inventor decided to investigate whether or not an electric field acting in (the hermetic glass bulb 2*a* of) the arc tube can be shielded by the metal oxide added to the shroud glass. As a result of experimentation, it was confirmed that the addition of metal oxide in a predetermined amount is effective for suppressing the passage of the $Na^+$ ion toward the outside of the arc tube, therefore, resulting in the present invention.

The invention has been made in consideration of the problems of the related art based on the knowledge of the inventor and has an object to provide a discharge bulb in which a predetermined amount of metal oxide is added to a shroud glass surrounding an arc tube, thereby reducing the influence of an external electric field acting on (the hermetic glass bulb of) the arc tube by an electrostatic shielding function and suppressing the passage of an $Na^+$ ion toward the outside of the arc tube.

SUMMARY OF THE INVENTION

In order to achieve the object, a first aspect of the invention is directed to a discharge bulb comprising an arc tube body having such a structure that a cylindrical shroud glass having metal oxide added thereto is welded integrally to surround an arc tube sealing Hg, NaI, ScI and Xe gases, wherein a total amount of addition of the metal oxide in the shroud glass ranges from 4000 to 7000 ppm.

A predetermined amount of metal oxide added to the shroud glass has such a configuration as to cover (the hermetic glass bulb of) the arc tube, thereby shielding (the hermetic glass bulb of) the arc tube against an external electric field (which will be hereinafter referred to as an electrostatic shielding function) and lessening the influence of the external electric field to act on (the hermetic glass bulb of) the arc tube. For this reason, the influence of the external electric field caused by the presence of a ground potential (0 volt) in the vicinity of the arc tube which acts on an $Na^+$ ion in (the hermetic glass bulb of) the arc tube (force for pulling the $Na^+$ ion in the direction of the presence of the ground potential (0 volt)) is reduced so that the $Na^+$ ion cannot pass through (the hermetic glass bulb of) the arc tube and the shroud glass.

The metal oxide contained in the shroud glass does not have a sufficient electrostatic shielding function for lessening the influence of the external electric field for (the hermetic glass bulb of) the arc tube if a total amount of addition is less than 4000 ppm. On the other hand, when the amount of the addition exceeds 7000 ppm, stripe-shaped concavo-convex portions are generated on the surface of the shroud glass or the conformability to the arc tube is deteriorated. Thus, the molding property and adhesion of the shroud glass is reduced. Consequently, it is desirable that the amount of metal oxide should range from about 4000 to 7000 ppm.

A second aspect of the invention is directed to the discharge bulb according to the first aspect of the invention, wherein the amount of addition of the metal oxide contained in the shroud glass has 1500 ppm or more of $Al_2O_3$ and 2500 ppm or more of $CeO_2$.

In general, a proper amount of $Al_2O_3$ is added to the shroud glass in order to prevent a devitrification phenomenon in which a halogen ion ionized in (the hermetic glass bulb of) the arc tube and an evaporated tungsten ion react with a quartz glass ($SiO_2$) to stick as a white crystal to the inside of the hermetic glass bulb. If the amount of $Al_2O_3$ is less than 1500 ppm, the devitrification phenomenon can be prevented effectively and the electrostatic shielding function cannot be obtained sufficiently. Consequently, the passage of Na towards the outside of the arc tube can not be prevented effectively. Moreover, the shroud glass has an insufficient chemical durability and mechanical hardness.

Moreover, if $CeO_2$ is less than 2500 ppm, it is impossible to sufficiently cut ultraviolet rays which are hazardous to a human body.

In order to effectively prevent the devitrification phenomenon, to sufficiently fulfill the electrostatic shielding function, to satisfy the chemical durability and the mechanical hardness, and to sufficiently cut the ultraviolet rays, accordingly, the amount of addition of $Al_2O_3$ is set to be 1500 ppm or more and the amount of addition of $CeO_2$ is set to be 2500 ppm or more.

A third aspect of the invention is directed to the discharge bulb according to the first or second aspect of the invention, wherein a sealed space between the arc tube and the shroud glass is filled with an inert gas (for example, Ar or Kr) having a pressure of one atmosphere or higher.

The inert gas (Ar or Kr) having a greater molecular weight than the molecular weight of air ($\approx$ the molecular weight of $N_2$) is present at one atmospheric pressure or more in a sealed space around (the hermetic glass bulb of) the arc tube. Consequently, a dielectric constant in the sealed space around the arc tube is increased and the external electric field acting on the arc is reduced so that the $Na^+$ ion correspondingly passes with difficulty.

A fourth aspect of the invention is directed to the discharge bulb according to any of the first to third aspects of the invention, wherein a metallic shielding shade for controlling light distribution is provided in the vicinity of the arc tube body and the shielding shade has an electromagnetic wave shielding function.

The metallic shielding shade for controlling light distribution which is held to the ground potential (0 volt) shields an electromagnetic wave generated from the arc tube, thereby inhibiting the generation of an electromagnetic noise in an electronic component. The presence of the metallic shielding shade (ground potential) provided in the vicinity of the arc tube body causes an electric field to act on an arc, thereby pulling the $Na^+$ ion toward the shielding shade side. By the electrostatic shielding function of the metal oxide added to the shroud glass, the electric field acting on the arc is small so that the passage of the $Na^+$ ion toward the outside of the arc tube can be suppressed.

BRIEF DESCRIPTION OF THE DRAWINGS

FIG. 3 is a table showing the relationship between the amount of addition of the metal oxide in the shroud glass and the passage of Na in each of examples 1 and 2, a related art example and comparative examples 1 and 2, FIG. 4 is a table showing the relationship between the amount of addition of $CeO_2$to be metal oxide, the passage of Na and a UV cut performance, FIG. 5 is a table showing the relationship between the amount of addition of $Al_2O_3$ to be metal oxide and the passage of Na, FIG. 6 is a table showing the relationship between the amount of addition of metal oxide and the molding property of the shroud glass.

DETAILED DESCRIPTION OF THE INVENTION

Next, an embodiment of the invention will be described based on an example.

Figure 1:
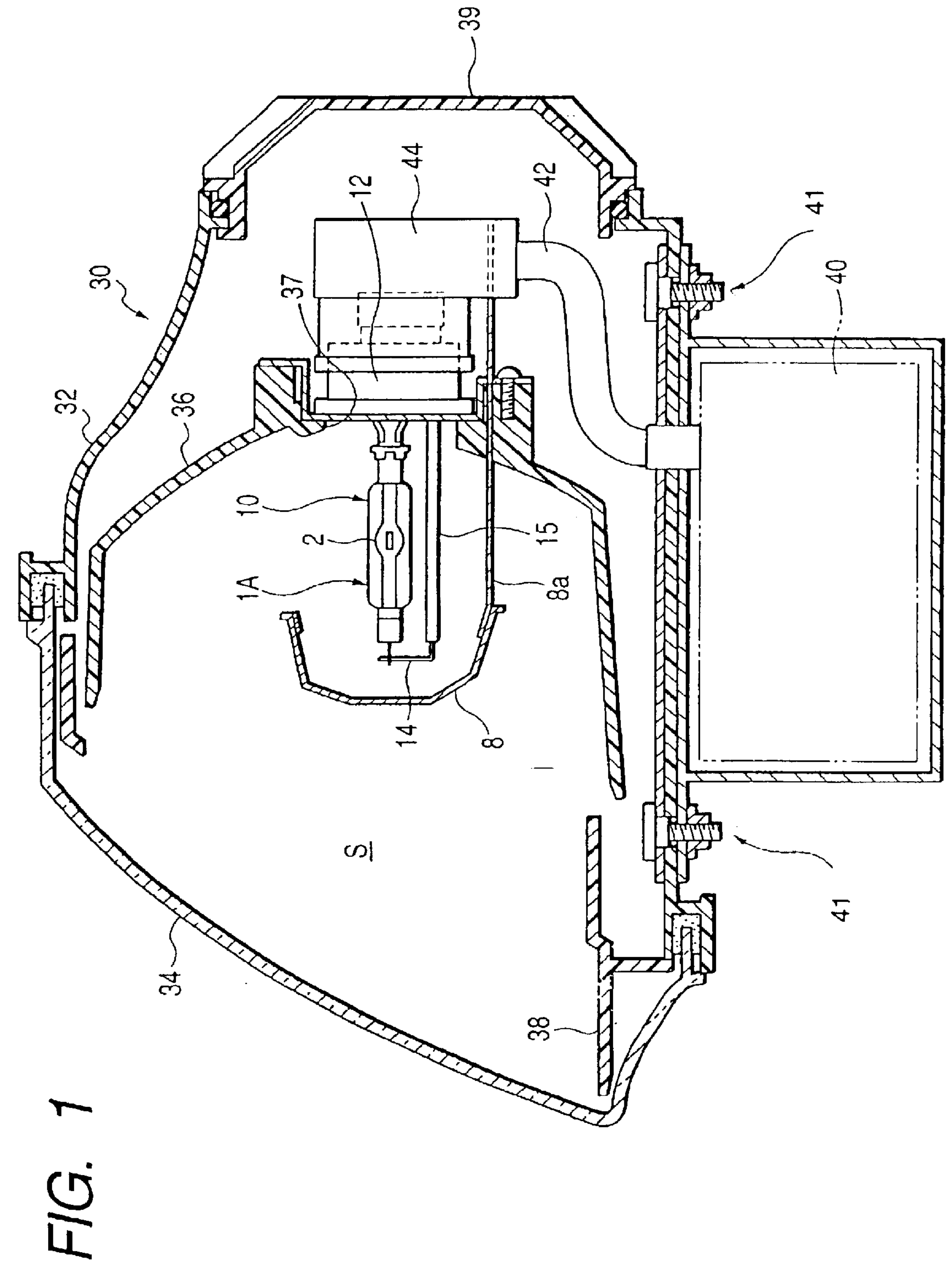
FIG. 1 is a longitudinal sectional view showing a headlamp for an automobile into which a discharge bulb according to an example 1 of the invention is inserted and attached.
Figure 2:
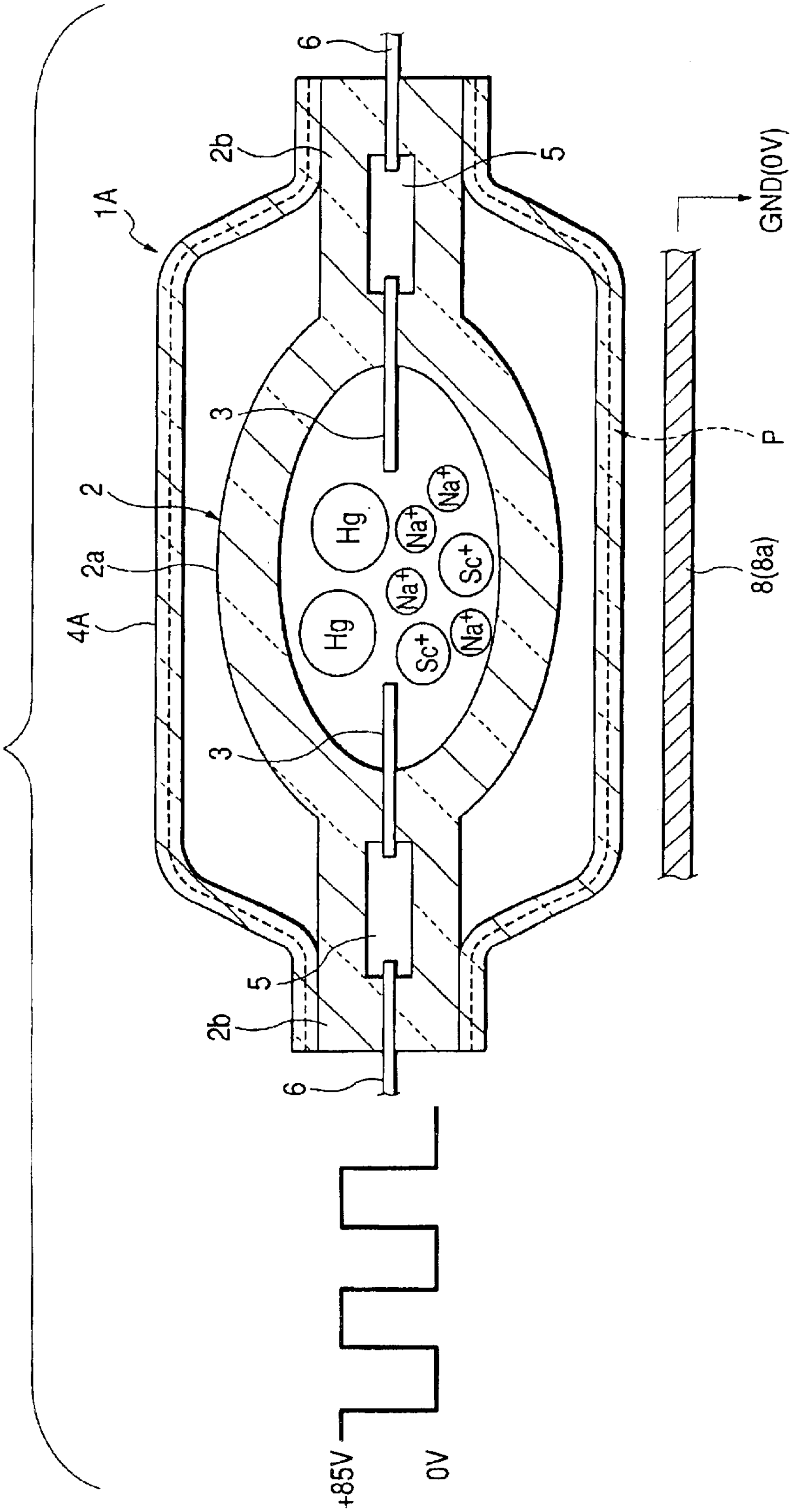
FIG. 2 is a view showing an electrostatic shielding function by metal oxide added to a shroud glass.

FIGS. 1 to 6 show a first example of the invention, and FIG. 1 is a longitudinal sectional view showing a headlamp for an automobile into which a discharge bulb according to an example 1 of the invention is inserted and attached, FIG. 2 is a view showing an electrostatic shielding function by metal oxide added to a shroud glass, FIG. 3 is a table showing the relationship between the amount of addition of the metal oxide in the shroud glass and the passage of Na in each of examples 1 and 2, a related art example and comparative examples 1 and 2, FIG. 4 is a table showing the relationship between the amount of addition of $CeO_2$ to be metal oxide, the passage of Na and a UV cut performance, FIG. 5 is a table showing the relationship between the amount of addition of $Al_2O_3$ to be metal oxide and the passage of Na, and FIG. 6 is a table showing the relationship between the amount of addition of metal oxide and the molding property of the shroud glass.

In FIG. 1, the reference numeral 30 denotes a headlamp for an automobile in which a front lens 34 is assembled to the opening of the front surface of a vessel-shaped lamp body 32 having the front surface opened to form a lighting chamber S and a reflector 36 is tiltably supported in the lighting chamber S by an aiming mechanism which is not shown. A discharge bulb 10 comprising an arc tube body 1A extended forward is inserted and attached to a bulb insertion hole 37 of the reflector 36, and a metallic shielding shade 8 having a leg portion 8*a* supported by the reflector 36 and serving to cover the arc tube body 1A in the discharge bulb 10 is provided ahead of the arc tube body 1A.

The discharge bulb 10 has such a structure that the arc tube body 1A is integrated therewith ahead of an insulating plug 12 formed of a synthetic resin, and the rear end of the arc tube body 1A is supported on the insulating plug 12 and the front end of the arc tube body 1A is supported on a metallic lead support 14 extended forward from the insulating plug 12. The reference numeral 15 denotes an insulating sleeve fitted in the lead support 14.

The shielding shade 8 shields direct rays emitted forward from the arc tube body 1A and prevents the generation of glare light, and furthermore, shields a part of light emitted toward the effective reflecting plane of the reflector 36 to contribute to the formation of a clear cut line in a low beam. The reference numeral 38 denotes an extension reflector and the reference numeral 39 denotes a back cover.

Further, the reference numeral 40 denotes alighting circuit—ballast circuit unit in which a lighting circuit (not shown) for applying a high voltage to the discharge bulb 10 to start a discharge and a ballast circuit (not shown) for continuously carrying out a stable discharge to the discharge bulb 10, which is fixed to the outside of the bottom portion of the lamp body 32 with, for example, screws 41. An output cord 42 led from the lighting circuit—ballast circuit unit 40 into the lamp body 32 is connected to the rear end of the discharge bulb 10 through a connector 44.

Moreover, the leg 8*a* of the shielding shade 8 is connected to a ground terminal (not shown) in the connector 44 through the reflector 36 so that the shielding shade 8 is always held to a ground level (0 V). For this reason, an electromagnetic wave generated during the light-up of the discharge bulb 10 (the discharge of the arc tube) is shielded by the shielding shade 8 and is not emitted to the surroundings, thereby reducing or eliminating any effects to electronic components, such as a car radio.

The arc tube body 10 has such a structure that a cylindrical shroud glass 4A for shielding ultraviolet rays is welded and attached (sealed and attached) integrally with an arc tube 2 including a hermetic glass bulb 2*a* having electrodes 3 and 3 provided opposite to each other, and the shroud glass 4A encloses and seals (surrounds) the hermetic glass bulb 2*a*. The reference numeral 5 denotes a molybdenum foil sealed and attached to a pinch seal portion 2*b* of the arc tube 2, and the electrode 5 and a lead wire 6 are connected to a side edge portion thereof to be opposed to each other, the electrode 5 being extended into the hermetic glass bulb 2*a* and the lead wire 6 being led from the pinch seal portion 2*b* to the outside.

The arc tube 2 is processed from a quartz glass tube taking the shape of a circular pipe and is provided with the hermetic glass bulb 2*a* taking the shape of a rotating ellipse interposed between the pinch seal portions 2*b* and 2*b* having rectangular cross sections in a predetermined position in a longitudinal direction. The glass bulb 2*a* is filled with Hg to be mainly a blue luminescent component, NaI to be mainly a red luminescent component, ScI to be mainly a green luminescent component, and an Xe gas to be a starting rare gas.

The shroud glass 4A is constituted by a quartz glass having an ultraviolet shielding function to which $CeO_2$ and $TiO_2$ are added in predetermined amounts, and ultraviolet rays within a predetermined wavelength range which are hazardous to a human body can be reliably cut from light emission in the hermetic glass bulb 2*a* to be a discharge portion. In order to suppress a devitrification phenomenon and to hold a chemical durability and a mechanical hardness, moreover, $Al_2O_3$ is also added to the shroud glass 4A. 1500 ppm or more of $Al_2O_3$ is added and the passage of Na through the hermetic glass bulb 2*a* is also suppressed.

Figure 7:
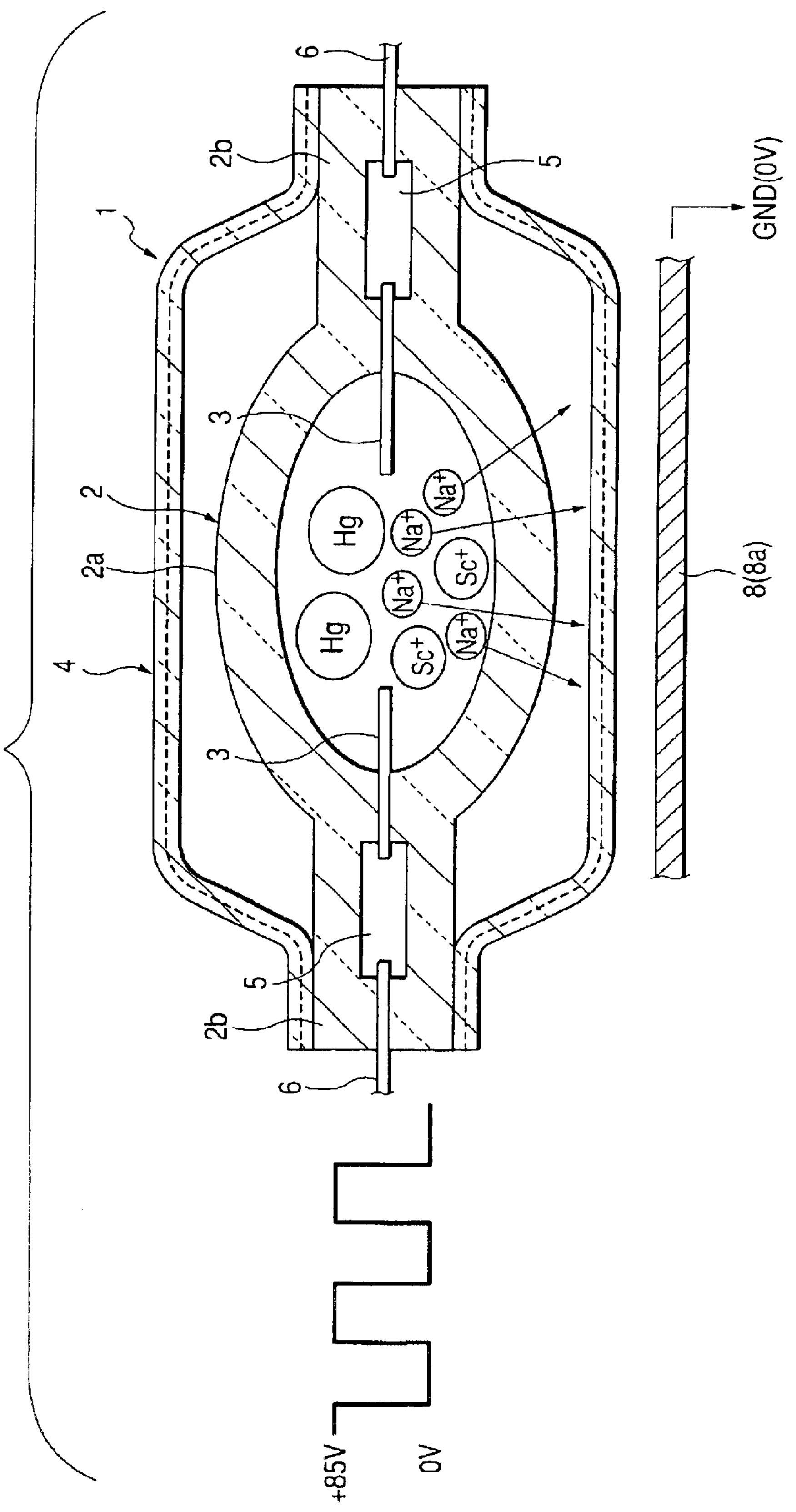
FIG. 7 is a view showing the state of the passage of Na to be a problem of the related art.
Figures 8, 9:
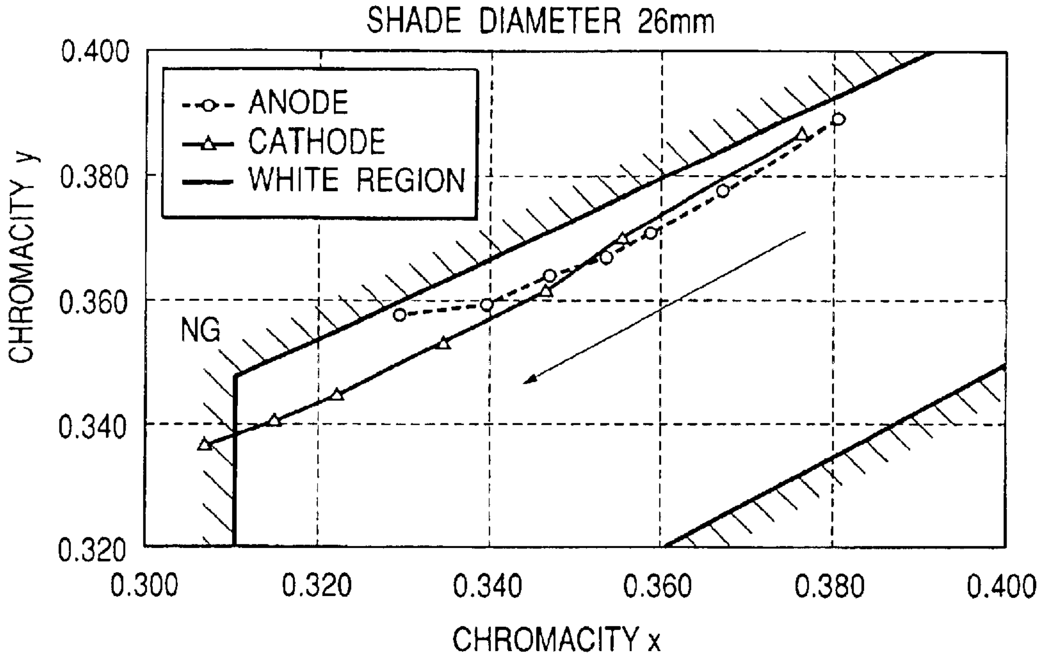
FIG. 8 is a chart showing a difference in a chromaticity (x, y) characteristic of light emission of an arc tube in a positive electrode lighting method and a negative electrode lighting method.
FIG. 9 is a table comparatively showing advantages and disadvantages of the positive electrode lighting method and the negative electrode lighting method.

More specifically, as shown in FIG. 2, NaI and ScI in (the hermetic glass bulb 2*a* of) the arc tube 2 are ionized to become an $Na^+$ ion and an $Sc^+$ ion by the light-up of the arc tube 2 (the discharge between the electrodes 3 and 3). The metallic shielding shade 8 for controlling the light distribution which is provided in the vicinity of the arc tube body 1A is held to the ground potential (0 volt) in order to shield an electromagnetic wave (an electromagnetic wave which causes an electromagnetic noise in an electronic component such as a car radio) generated from a conducting path such as an electrode assy (the electrode 3, the molybdenum foil 5, the lead wire 6) during the light-up of the arc tube 2 (the discharge between the electrodes 3 and 3). Consequently, an electric field is generated between the electrode 3 to which a lamp voltage of +85 V is applied by the positive electrode lighting method and the shielding shade 8 having the ground potential (0 V) so that force for pulling the $Na^+$ ion and the $Sc^+$ ion generated in the hermetic glass bulb 2*a* in the direction of the ground potential (0 V) acts. The $Na^+$ ion is smaller than the molecules of the $Sc^+$ ion and the quartz glass (the molecule of the quartz glass constituting the arc tube 2 and the shroud glass 4A). Consequently, there is a possibility that the $Na^+$ ion might pass through the side wall of the arc tube 2 and that of the shroud glass 4A by the force of the external electric field (see FIG. 7), that is, the passage of the $Na^+$ ion might be caused.

However, 1500 ppm or more of $Al_2O_3$ added to the shroud glass 4A has such a configuration P as to surround (the hermetic glass bulb 2*a* of) the arc tube 2 as shown in a broken line of FIG. 2 so that (the hermetic glass bulb 2*a* of) the arc tube 2 is electrostatically shielded against the external electric field. Consequently, the inside of (the hermetic glass bulb 2*a* of) the arc tube 2 is not influenced by the external electric field. Therefore, the force applied by the external electric field (the force for pulling the $Na^+$ ion and the $Sc^+$ ion to the direction of the ground potential (0 volt)) does not act on the $Na^+$ ion and the $Sc^+$ ion in (the hermetic glass bulb 2*a* of) the arc tube 2 so that the passage of the $Na^+$ ion through (the hermetic glass bulb 2*a* of) the arc tube 2 and the shroud glass 4A is suppressed. Accordingly, there is no drawback that Na passes toward the outside of the arc tube to cause the luminescent color of the arc tube 2 to be pale or a deterioration in a luminous flux.

It is desirable that the amount of the addition of $Al_2O_3$ which is effective for preventing the passage of Na should be 1500 ppm or more as shown in FIG. 5. By experimentation, it has been confirmed that the electrostatic shielding function (the function to be a barrier such that the external electric field is not applied) is enhanced almost proportional to the amount of the addition, and the function of suppressing the passage of Na is effective within the range of the amount of addition from 1500 to 2000 ppm. In other words, the electrostatic shielding function does not fully function if the amount of addition of $Al_2O_3$ is less than 1500 ppm. Consequently, the passage of Na cannot be prevented effectively. Furthermore, the chemical durability of the shroud glass 4A becomes insufficient and a mechanical hardness thereof is also reduced.

Moreover, the UV cut performance of the shroud glass 4A mainly depends on the presence of $CeO_2$ and $TiO_2$ greatly, and it is preferable that the amount of addition of $CeO_2$ should be 1500 ppm or more as shown in FIG. 4. It has been confirmed that the amount of addition of 2500 ppm or more is desirable and the amount of addition of 3000 ppm or less is effective in order to suppress the passage of Na. While $CeO_2$ is added in an amount of approximately 500 ppm in a UV cut glass for general illumination, the amount of addition is increased such that a strict UV cut performance required for (the shroud glass of) the arc tube to be a lighting tool for an automobile can be satisfied in the example (see FIG. 3).

For the UV cut performance, $CeO_2$ may be added in place of $TiO_2$.

Moreover, it is desirable that the amount of addition of $Al_2O_3$ which is mainly effective for suppressing the passage of Na should be 1500 ppm or more and the amount of addition of $CeO_2$ which is mainly effective for the UV cut should be 2500 ppm or more. Therefore, it is desirable that the total amount of addition of both $Al_2O_3$ and $CeO_2$ should be 4000 ppm or more. As shown in FIG. 6, moreover, there is no problem if the total amount of addition of metal oxide containing $Al_2O_3$ and $CeO_2$ is 5000 ppm. If the total amount is 7000 ppm, stripe-shaped concavo-convex portions are formed on the surface of the shroud glass. If the total amount is 9000 ppm, the concavo-convex portions are remarkable and appearance is deteriorated. In addition, there is a possibility that predetermined light distribution might not be obtained due to the scatter of the light caused by the concavo-convex portions, which is not preferable. Accordingly, it is desirable that the total amount of addition of the metal oxide containing $Al_2O_3$ and $CeO_2$ should be 4000 ppm or more and less than 7000 ppm.

Moreover, an inert gas (Ar or Kr) is filled in the internal space of the shroud glass 4A surrounding the arc tube 2 to fulfill an adiabatic function for the radiation of heat from the hermetic glass bulb 2*a* to be a discharge portion and a design is carried out such that a lamp characteristic is not influenced by a change in an external environment. Moreover, the pressure of the inert gas (Ar or Kr) filled in the internal space of the shroud glass 4A is set to be one atmospheric pressure or more at an ordinary temperature, and a large number of molecules are present with a greater molecular weight than the molecular weight of air (≈ the molecular weight of $N_2$) in the sealed space provided around the arc tube 2. Correspondingly, a dielectric constant in the sealed space surrounding the hermetic glass bulb 2*a* is increased. Consequently, an electric field acting on the arc is reduced so that the $Na^+$ ion passes with difficulty.

While the description has been given to the structure in which Na in the hermetic glass bulb 2*a* passes with difficulty in the case in which the discharge bulb 10 is lit up by the positive electrode lighting method (a lamp voltage of +85 V is applied and the discharge is carried out between the electrodes 3 and 3, for example) the invention is also effective for the case in which the discharge bulb 10 is lit up by a cathode lighting method. In other words, in the case in which the discharge bulb 10 is lit up by the cathode lighting method (a lamp voltage of −85 V is applied and the discharge is carried out between the electrodes 3 and 3, for example), an electric potential between the electrodes 3 and 3 is always set to be −85 V. Therefore, the $Na^+$ ion in the hermetic glass bulb 2*a* is held to a minus electric field and Na passes toward the outside of (the hermetic glass bulb 2*a* of) the arc tube 2 with more difficulty as compared with the case of the positive electrode lighting. However, the inside of the hermetic glass bulb 2*a* of the arc tube 2 during the light-up has a high temperature and pressure. Therefore, the passage of the $Na^+$ ion having a smaller molecule than that of the quartz glass from the hermetic glass bulb 2*a* is obtained by the high pressure. Accordingly, it is apparent that the invention can also be applied to the case in which the light-up is carried out by the cathode lighting method.

As is apparent from the above description, according to the discharge bulb in accordance with the first aspect of the invention, the external electric field does not reach the $Na^+$ ion in the arc tube by the electrostatic shielding function of the metal oxide in a predetermined amount which is added to the shroud glass and the $Na^+$ ion in the arc tube does not pass toward the outside but stays in an inner part. Differently from the related art, there is no drawback that Na passes toward the outside of the arc tube to cause the luminescent color of the arc tube to be pale and to reduce a luminous flux. Consequently, proper light emission is guaranteed for a longer period of time.

According to the second aspect of the invention, the devitrification phenomenon is not presented on the arc tube. Differently from the related art, furthermore, there is no drawback that Na passes toward the outside of the arc tube to cause the luminescent color of the arc tube to be pale and to reduce a luminous flux. Consequently, proper light emission is guaranteed for a longer period of time.

According to the third aspect of the invention, the magnitude of the electric field acting on the arc is further reduced. Correspondingly, the passage of the $Na^+$ ion toward the outside of the arc tube is suppressed. Consequently, it is possible to further eliminate such a drawback that the luminescent color of the arc tube becomes pale and the luminous flux is reduced. As such, again, proper light emission is guaranteed for a longer period of time.

According to the fourth aspect of the invention, an electromagnetic noise is not generated in an electronic component provided in the vicinity of the discharge bulb. Differently from the related art, it is possible to eliminate such a drawback that the Na passes toward the outside of the arc tube to cause the luminescent color of the arc tube to be pale and to reduce the luminous flux. Consequently, proper light emission is guaranteed for a longer period of time.

Although the invention has been described in its preferred embodiments, it is understood that the invention is not limited to the specific above-described embodiments. For example, while the embodiments described identified the desirable amounts of metal oxide to be added to the shroud glass, one of ordinary skill in the art should recognize that amounts on either side of the ranges can still be effective in obtaining the object of the invention. It is contemplated that numerous modifications may be made to the present invention without departing from the spirit and scope of the invention as defined in the claims.

What is claimed is:

1. A discharge bulb comprising:

an arc tube body including a cylindrical shroud glass having metal oxide added thereto, the cylindrical shroud glass joined integrally to surround an arc tube sealing gases comprising Hg, NaI, ScI and Xe gases, wherein a total amount of the metal oxide added to the shroud glass ranges from about 4000 to 7000 ppm, and wherein the amount of the metal oxide contained in the shroud glass includes about 1500 ppm or more of $Al_2O_3$ and about 2500 ppm to about 3000 ppm of $CeO_2$.

2. The discharge bulb according to claim 1, wherein a sealed space between the arc tube and the shroud glass is filled with an inert gas having a pressure of one atmosphere or more.

3. The discharge bulb according to claim 2, wherein the inert gas includes at least one of Ar and Kr.

4. The discharge bulb according to claim 1, wherein a sealed space between the arc tube and the shroud glass is filled with an inert gas having a pressure of one atmosphere or more.

5. The discharge bulb according to claim 4, wherein the inert gas includes at least one of Ar and Kr.

6. The discharge bulb according to claim 1, wherein a metallic shielding shade for controlling light distribution is provided in the vicinity of the arc tube body and the shielding shade is operable to shield electromagnetic waves.

7. A discharge bulb comprising:

an arc tube body including a cylindrical shroud glass having metal oxide added thereto, the cylindrical shroud glass joined integrally to surround an arc tube sealing gases comprising NaI, ScI and Xe gases, wherein a total amount of the metal oxide added to the shroud glass ranges from about 4000 to 7000 ppm, and wherein the amount of the metal oxide contained in the shroud glass includes about 1500 ppm or more of $Al_2O_3$ and about 2500 ppm to about 3000 ppm of $CeO_2$.

* * * * *